United States Patent
Cox et al.

(10) Patent No.: US 12,123,601 B2
(45) Date of Patent: Oct. 22, 2024

(54) DUAL FUNCTION DOMESTIC HOT WATER PREHEATER AND INTEGRATED SPACE HEATER

(71) Applicant: Radiator Labs, Inc., New York, NY (US)

(72) Inventors: Marshall Cox, Brooklyn, NY (US); Ioannis Kymissis, New York, NY (US)

(73) Assignee: Radiator Labs, Inc., New York, NY (US)

( * ) Notice: Subject to any disclaimer, the term of this patent is extended or adjusted under 35 U.S.C. 154(b) by 285 days.

(21) Appl. No.: 17/518,207

(22) Filed: Nov. 3, 2021

(65) Prior Publication Data

US 2022/0057088 A1 Feb. 24, 2022

Related U.S. Application Data

(63) Continuation of application No. PCT/US2020/031324, filed on May 4, 2020.
(Continued)

(51) Int. Cl.
| | |
|---|---|
| F24D 3/08 | (2006.01) |
| F24D 17/00 | (2022.01) |
| F24D 19/10 | (2006.01) |
| F24H 7/02 | (2022.01) |
| F24H 15/164 | (2022.01) |
| F24H 15/277 | (2022.01) |
| F24H 15/36 | (2022.01) |
| F24H 15/37 | (2022.01) |
| F24H 15/45 | (2022.01) |
| G05B 19/4155 | (2006.01) |

(52) U.S. Cl.
CPC ......... *F24D 3/082* (2013.01); *F24D 17/0036* (2013.01); *F24D 19/1081* (2013.01); *F24H 7/02* (2013.01); *F24H 15/164* (2022.01); *F24H 15/277* (2022.01); *F24H 15/36* (2022.01); *F24H 15/37* (2022.01); *F24H 15/45* (2022.01); *G05B 19/4155* (2013.01); *F24H 2250/02* (2013.01); *G05B 2219/50333* (2013.01)

(58) Field of Classification Search
None
See application file for complete search history.

(56) References Cited

U.S. PATENT DOCUMENTS

| | | | |
|---|---|---|---|
| 3,661,325 A | 5/1972 | Altenstadt | |
| 4,175,518 A | 11/1979 | Reames, Jr. | |

(Continued)

FOREIGN PATENT DOCUMENTS

| | | | | |
|---|---|---|---|---|
| CN | 108954468 A | * | 12/2018 | ............. F24D 13/04 |
| DE | 102010011573 A1 | * | 9/2011 | ............ F24D 11/004 |

(Continued)

OTHER PUBLICATIONS

Extended European Search Report for Application No. EP20801880.4, mailed on Dec. 19, 2022, 12 pages.
(Continued)

*Primary Examiner* — David Earl Ogg
(74) *Attorney, Agent, or Firm* — COOLEY LLP

(57) ABSTRACT

Embodiments described herein generally relate to a domestic hot water (DHW) preheater operable to supply domestic hot water to a structure and/or to preheat a cold return of a space heating system.

15 Claims, 6 Drawing Sheets

Related U.S. Application Data

(60) Provisional application No. 62/842,946, filed on May 3, 2019.

(56) References Cited

U.S. PATENT DOCUMENTS

| | | | | |
|---|---|---|---|---|
| 4,235,369 | A * | 11/1980 | Huber | F24D 11/0228 |
| | | | | 62/238.7 |
| 4,467,178 | A * | 8/1984 | Swindle | G05D 23/1904 |
| | | | | 219/508 |
| 2008/0262979 | A1 * | 10/2008 | Metcalfe | F24H 15/421 |
| | | | | 705/412 |
| 2009/0090310 | A1 * | 4/2009 | Farrell | F24H 1/52 |
| | | | | 122/20 A |
| 2011/0218683 | A1 * | 9/2011 | Ben-Yaacov | F24D 11/0228 |
| | | | | 700/278 |
| 2013/0266295 | A1 * | 10/2013 | Kreutzman | F24H 15/37 |
| | | | | 392/308 |
| 2016/0341447 | A1 * | 11/2016 | Wyatt | F28F 13/12 |
| 2018/0073748 | A1 * | 3/2018 | Gagne | F23N 1/102 |

FOREIGN PATENT DOCUMENTS

| | | |
|---|---|---|
| EP | 0759528 A1 * | 4/1996 |
| WO | WO-2016042312 A1 | 3/2016 |
| WO | WO-2017103955 A1 | 6/2017 |

OTHER PUBLICATIONS

International Search Report and Written Opinion issued in PCT/US2020/031324, dated Aug. 18, 2020, 10 pages.

* cited by examiner

DUAL FUNCTION DOMESTIC HOT WATER PREHEATER AND INTEGRATED SPACE HEATER

CROSS REFERENCE TO RELATED APPLICATIONS

This application is a continuation of International Patent Application No. PCT/US2020/031324, filed May 4, 2020, which claims the benefit of and priority to U.S. Provisional Patent Application No. 62/842,946, filed May 3, 2019, the entire disclosure of each of which is hereby incorporated by reference.

BACKGROUND

A variety of methods for space heating and a variety of methods for heating water are known. One solution known in domestic installations is to operate a space heating system and a water heating system as separate circuits. Such installations, however, can have substantial footprints, because space is used for both the furnace/heat pump and a hot water heater.

Another known solution, which may be used, for example, when insufficient space exists for a separate hot water heater, is to employ a steam boiler to produce domestic hot water and for hydronic space heating. The use of such systems to produce on-demand domestic hot water can be inefficient, particularly during warmer weather when the boiler operates primarily to produce hot water.

A need therefore exists for a preheater suitable for domestic hot water production that can improve the efficiency of space heating systems while having a reduced footprint.

DETAILED DESCRIPTION

Figure 1:
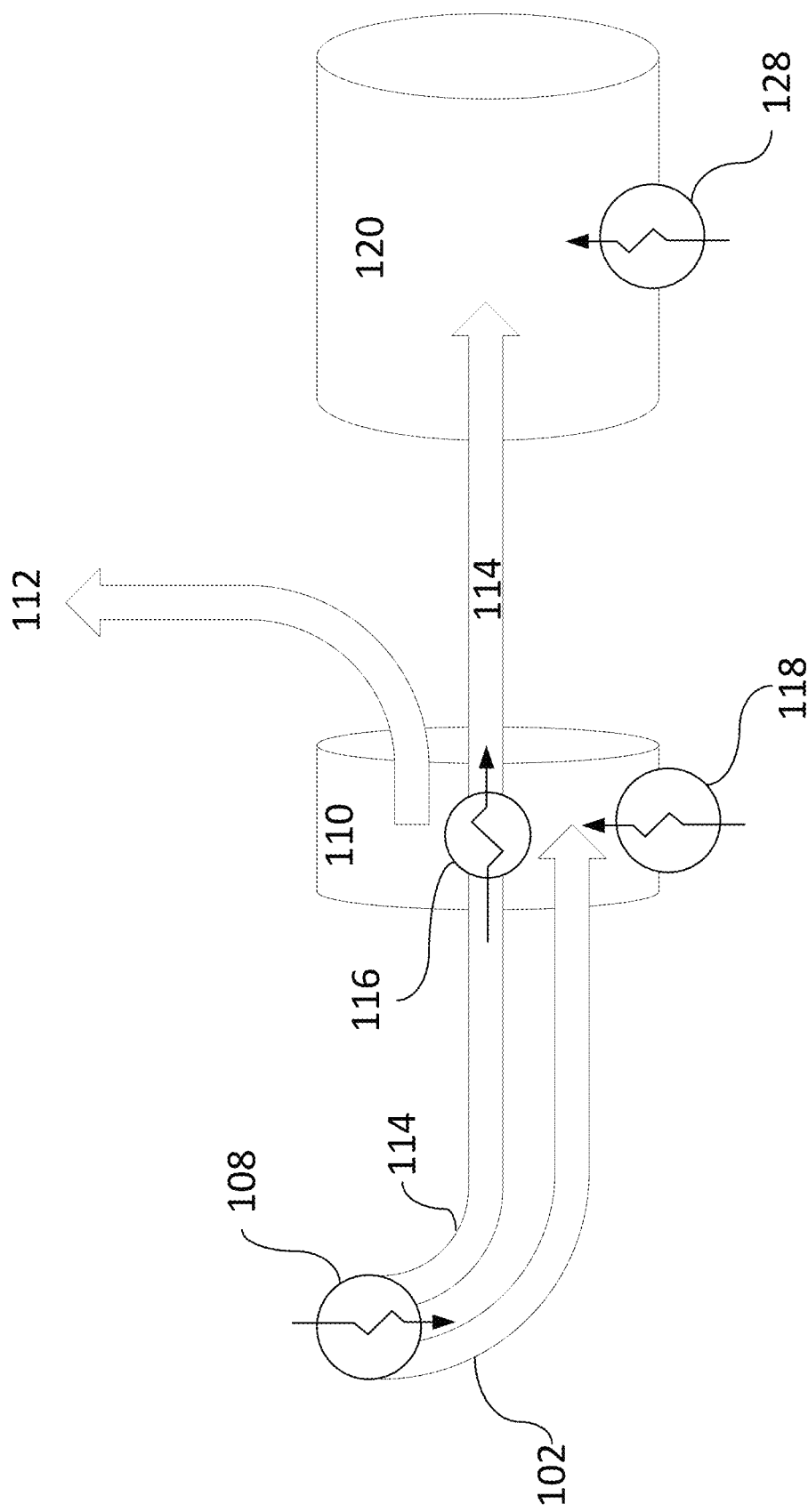
FIG. 1 is a schematic diagram of a space heating and domestic hot water (DHW) installation, according to an embodiment.

FIG. 1 is a schematic diagram of a space heating and domestic hot water installation, according to an embodiment. The installation includes a domestic hot water (DHW) preheater 110 and a boiler and/or a space heater 120. Similarly stated, the installation can be suitable to simultaneously generate hot water and hot air. The boiler and/or space heater 120 can supply heat to a hydronic heating system, a steam heating system or other steam loop, a forced hot air system or any other suitable load circuit.

The DHW preheater 110 can be used both to supply domestic hot water as well as to preheat an input for the space heater and/or boiler 120. Similarly stated, the DHW preheater can have a first output 112 to supply domestic hot water and a second outlet 114 to supply hot water to the boiler 120 or otherwise transfer heat from a domestic water source to the boiler 120 and/or space heater such that the boiler 120 and/or space heater receives conditioned water, steam, and/or air. As described in further detail herein, by placing the DHW preheater 110 stage upstream of the boiler 120 and/or space heating stage, the overall efficiency of the installation can be improved.

The DHW preheater 110 can transfer heat to a steam return condensate 114, return water, forced hot air return, the return loop of a hydronic heating loop, or any other suitable return, for example, from a space heating circuit. The DHW preheater 110 can transfer heat to the return 114 via a heat exchanger 116, as shown in FIG. 1, or the DHW 110 can serve as a collector or reservoir between the return 114 and the boiler 120. The DHW preheater stage can heat water to, for example, approximately 150 degrees F. Similarly stated, the hot side of a heat exchanger used to transfer heat to a return loop for the heating stage and/or boiler can be, for example, approximately 150 degrees F. In other embodiments, the DHW preheater 110 stage can heat water to approximately 125 degrees F., 200 degrees F., and/or any other suitable temperature. The DHW preheater 110 can include an outflow 112 configured to supply domestic hot water. A makeup inflow 102 can replenish the DHW preheater 110.

As described in further detail herein the DHW preheater stage 120 can heat the water using any suitable energy source 118 such as, for example, electricity, natural gas, propane, diesel, coal, biomass pellets, wood, kerosene, geothermal, heat pump, solar hot water, micro-combined heat and power (micro-CHP), etc. In some embodiments, the DHW preheater stage 110 can heat the water using flue gas or other process heat source. In addition or alternatively, a flue-gas heat exchanger, process heat source, or other suitable heat source can be used as a pre-stage 108 before the DHW preheater. The DHW preheater 110 can be highly modular, such that the DHW preheater can be added to existing boiler 120 or furnace installations, be amenable to design changes, changes in heating source, addition or subtraction of additional DHW preheaters (e.g., in parallel or in series), drop-in replacement, etc.

The boiler 120 or furnace installation can be configured to further heat a fluid pre-heated by the DHW preheater stage 120 using any suitable heat source 128, such as natural gas, municipal steam, heating oil, diesel, etc. Similarly stated, one or more heating systems can be inserted into the boiler cavity. The boiler 120 can be operable to heat the conditioned input 114 that was received from the DHW preheater 110 to 180-212 degrees F. (or any other suitable temperature). In some embodiments, the boiler 120 can be sized to a 5 mm BTU/hr modulating load or any other suitable load. In some embodiments, the boiler 120 can have a smaller footprint and/or power plant (for example per unit of heating capacity) when coupled to a DHW preheater 110 as compared to known installations. In some instances, no changes to a pre-existing boiler 120, other than moving a DHW outflow 112 or make-up 102 from the boiler 120 to the DFW preheater 110, are necessary when adding the DHW preheater stage 120.

Figure 2:
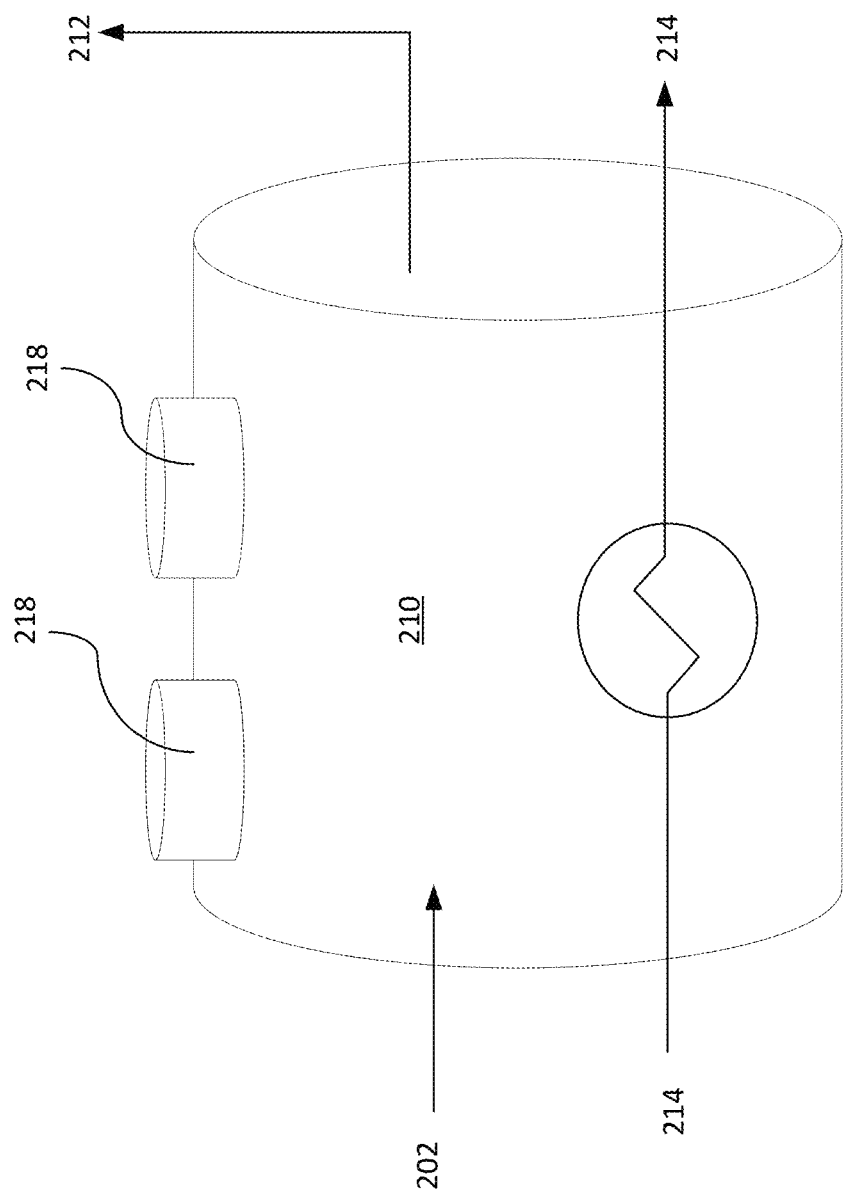
FIG. 2 is a schematic diagram of a DHW preheater, according to an embodiment.

FIG. 2 is a schematic diagram of a DHW preheater 210, according to an embodiment. The DHW preheater can include one or more ports 218 suitable to accept one or more heating elements or to integrate one or more fuel sources. For example, an electric immersion heater can be installed in one port, while a natural gas fed heater can be installed in another port. In some embodiments each heat source can be sized to a typical or expected DHW load such as, for example, approximately 500 k BTU/hr (~50 kW).

In a manner similar to that discussed above with reference to FIG. 1, the DHW preheater 210 can have an inlet 202 to receive makeup water and an outlet 212 to supply domestic hot water. Additionally, the DHW preheater 210 can be operable to transfer heat to a boiler inlet 214 or return, thereby reducing the load to the boiler, granting additional fuel flexibility, and/or increasing capacity.

In some embodiments, the DHW preheater 210 can include a processor (not shown), a memory (not shown), and a network module (not shown). The processor, the memory, and the network module can be communicatively coupled. The processor can further be communicatively coupled to an output module, which can, for example, be operable to control one or more of the DHW heat sources and/or a heat exchanger between the space heater and/or boiler. Similarly stated, the processor can be operable to turn one or more of the heat sources on and off and/or control the intensity of the heat source.

The processor can be, for example, a general purpose processor, a Field Programmable Gate Array (FPGA), an Application Specific Integrated Circuit (ASIC), a Digital Signal Processor (DSP), and/or the like. The processor can be configured to retrieve data from and/or write data to memory, e.g., the memory, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth.

The DHW preheater can be communicatively coupled to a compute device, e.g., via the network module and a network. The network can be, for example, the internet, an intranet, a combination of an intranet and the internet, etc. The DHW preheater can be operable to determine the current price of electricity, natural gas, and/or other heat source(s), for example, via the internet. A non-transitory processor readable medium stored on the memory can be operable to cause the processor to calculate the cost of preheating the water within the DHW preheater using some or all installed power sources. In some embodiments, such as an embodiment where each power source is sized to a full DHW load, the DHW preheater can select the most efficient and/or the most cost effective fuel source based on current prices and/or respond to utility demand response actions and/or incentives. In some embodiments, the DHW preheater can be operable to scale power consumption based on current prices, for example, deferring heating during peak-rate times (e.g., during midday) and taking advantage of off-peak rates (e.g., at night). For example, during an off-peak rate, in some embodiments, the DHW preheater can be operable to operate above 100% of the current or a typical load (e.g., firing more than one heat source), for example to make up for deferred heating during a peak-rate time and/or to generate and store heat when the cost of heat production is low.

In some embodiments, the DHW preheater can be operable to be communicatively coupled to a command and control server and/or an information server (e.g., via the network module and the network). A command-and-control server can receive telemetry (e.g., input temperature, outlet temperature, energy consumption, flow rate, load, etc.) from the DHW preheater and/or boiler and direct the operation of the DHW preheater. An information server can provide data to the DHW preheater (e.g., heating prices, demand forecast, etc.). The DHW preheater can determine operating parameters based on information received from such an information server.

In some embodiments, an active heat transfer system can be controlled by a processor (e.g., executing code stored in the memory) of the DHW preheater or any other suitable means. For example, in some embodiments, the DHW preheater can be operable to transfer less heat to the boiler and/or space heater during a period of peak hot water demand or low hot water temperature. Similarly, during a period of low hot water demand or hot water over-temperature, the DHW preheater can increase the rate of heat transfer to the boiler and/or space heater.

Figure 4:
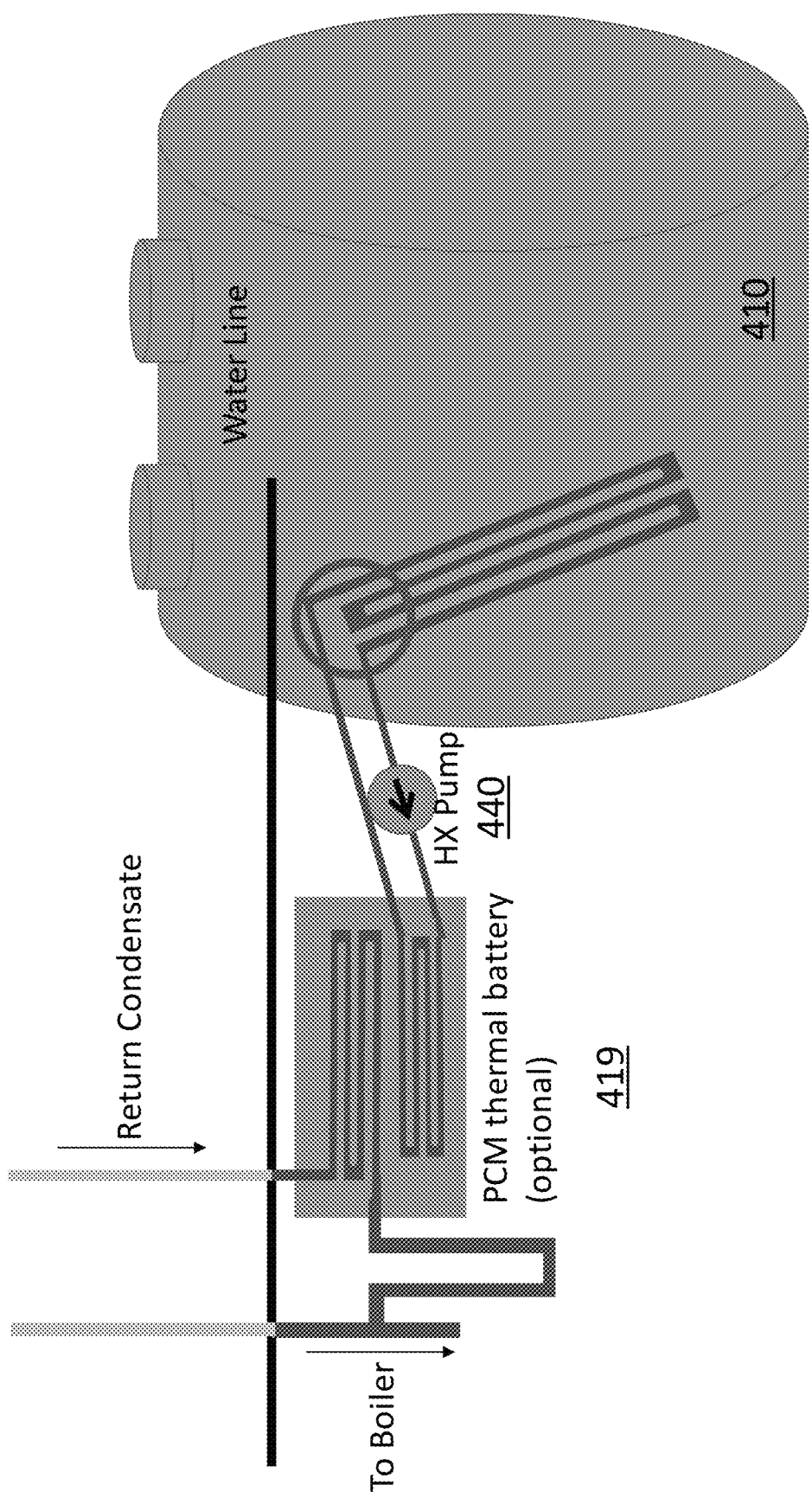
FIG. 4 is a schematic illustration of a DHW preheater having an active heat transfer system and thermal battery, according to an embodiment.
Figure 5:
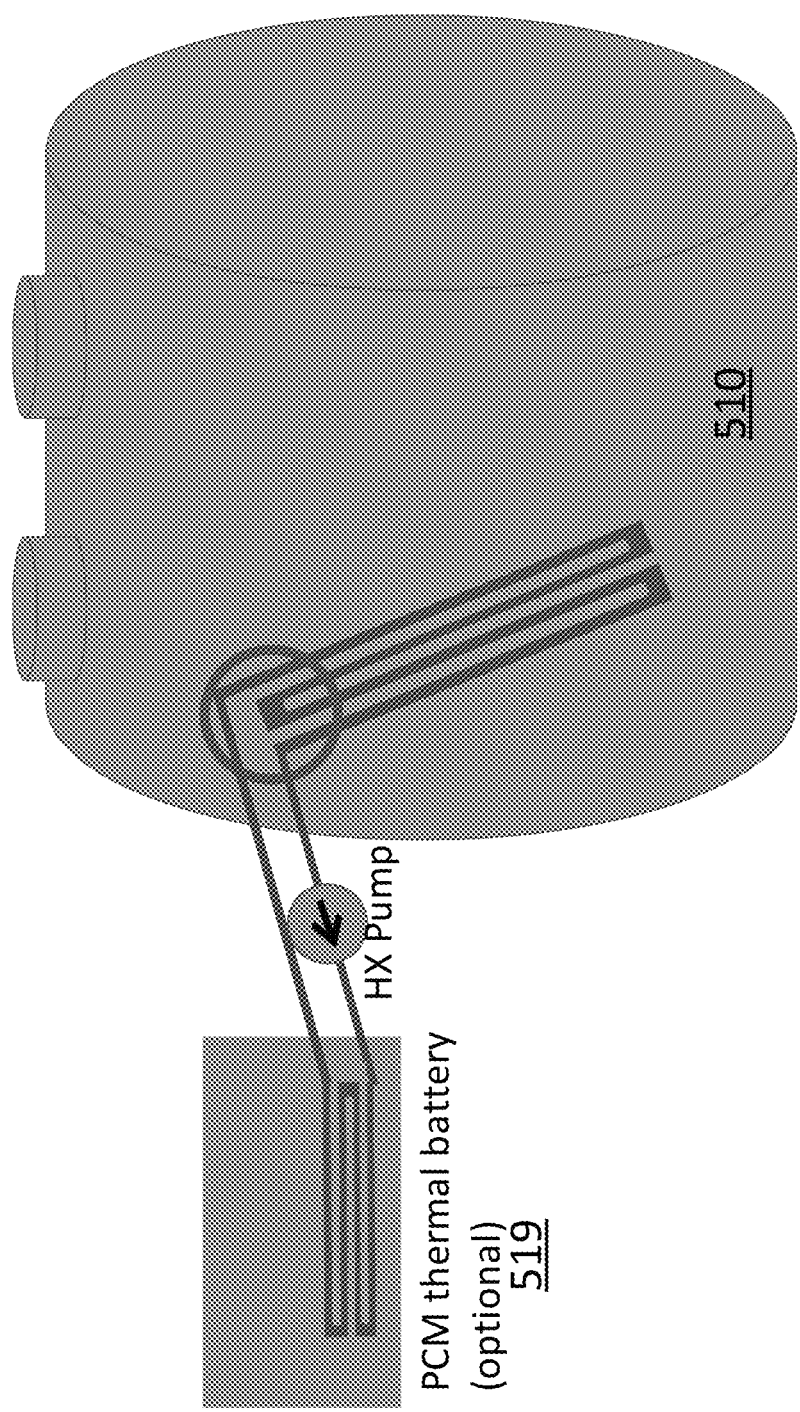
FIG. 5 is a schematic illustration of a DHW preheater having an active heat transfer system and thermal battery configured to transfer heat to a forced hot air space heating system, according to an embodiment.

The DHW preheater can be highly insulated, which can allow the preheated water to substantially maintain its temperature over the course of several hours. In this way, the DHW preheater can function as a thermal battery. Such stored heat can contribute significantly to space-heating demand at later times. In addition, insulation can increase the ability of the DHW preheater to plan power consumption to avoid peak rates and/or can generally improve the efficiency of the DHW preheater. As shown in FIGS. 4 and 5, some embodiments can include an additional thermal battery, such as a phase change material (PCM) thermal battery that can provide thermal capacity in addition to the thermal mass of the water contained within the DHW preheater. Such a thermal battery can be installed on the hot water side of the DHW preheater.

Figure 3:
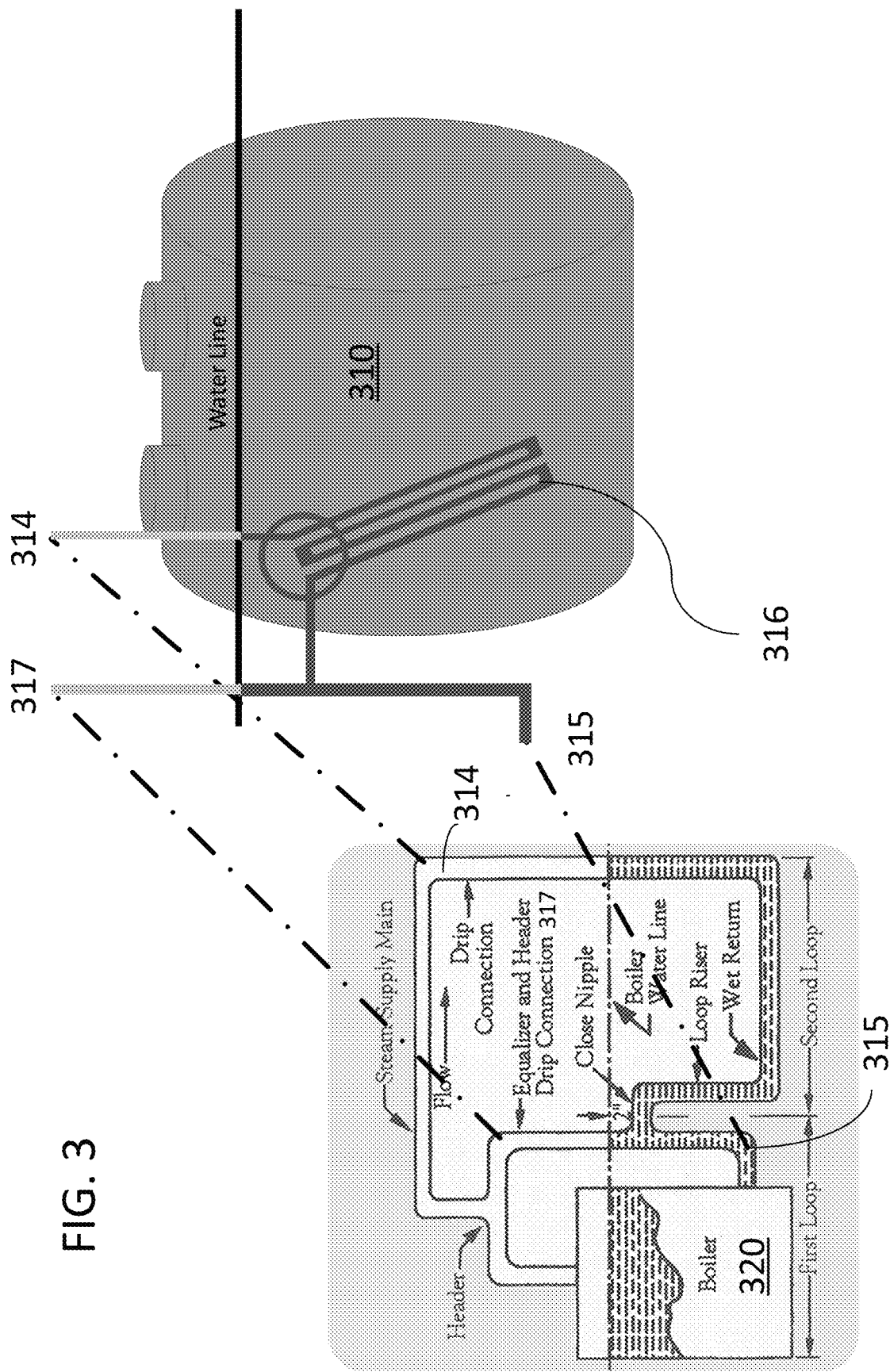
FIG. 3 is a schematic illustration of a DHW preheater 310 having a passive heat exchanger for steam space heating, according to an embodiment.

FIG. 3 is a schematic illustration of a DHW preheater 310 having a passive heat exchanger for steam space heating, according to an embodiment. FIG. 3 illustrates how the DHW preheater 310 can be integrated into an existing Hartford loop that contains a boiler 320. The cold steam return 314 can be an input to the DHW preheater 310, where a heat exchanger 316 can warm the cold steam return, for example to approximately 150 degrees F. This conditioned return 315 can then be connected to the equalizer and header drip connection 317 and fed to the boiler 320.

FIG. 4 is a schematic illustration of a DHW preheater 410 having an active heat transfer system and thermal battery 419 (e.g., thermal mass storage, a phase change material (PCM) and/or other suitable thermal battery), according to an embodiment. Unlike many traditional systems, the DHW preheater 410 shown in FIG. 4 can contribute to space heating even when the DHW temperature is set to a lower temperature than typically used for space heating. Particularly compared to traditional steam-based systems, this can result in significantly improved efficiencies.

A pump 440 can be operable to circulate fluid from the DHW preheater 410 through a heat exchanger located in the thermal battery 419. This can allow for controlled heat transfer between the DHW preheater 410 and a boiler (not shown in FIG. 4). The thermal battery 419 can also, in some situations, increase thermal coupling between the DHW preheater 410 and the boiler. Additionally, by controlling the pump 440, heat transfer from the DHW preheater 410 can be controlled based on, for example, current or expected DHW demand, current or expected space heating demand, energy price, etc.

FIG. 5 is a schematic illustration of a DHW preheater 510 having an active heat transfer system and thermal battery 519 (e.g., thermal mass storage, a PCM, and/or other suitable thermal battery) configured to transfer heat to a hot air space heating system, according to an embodiment. Similarly stated, heat can be transferred from the thermal batter 519 to a cold air return for a forced hot air space heating system in a manner similar to the transfer of heat to the return condensate as shown in FIG. 4.

Figure 6:
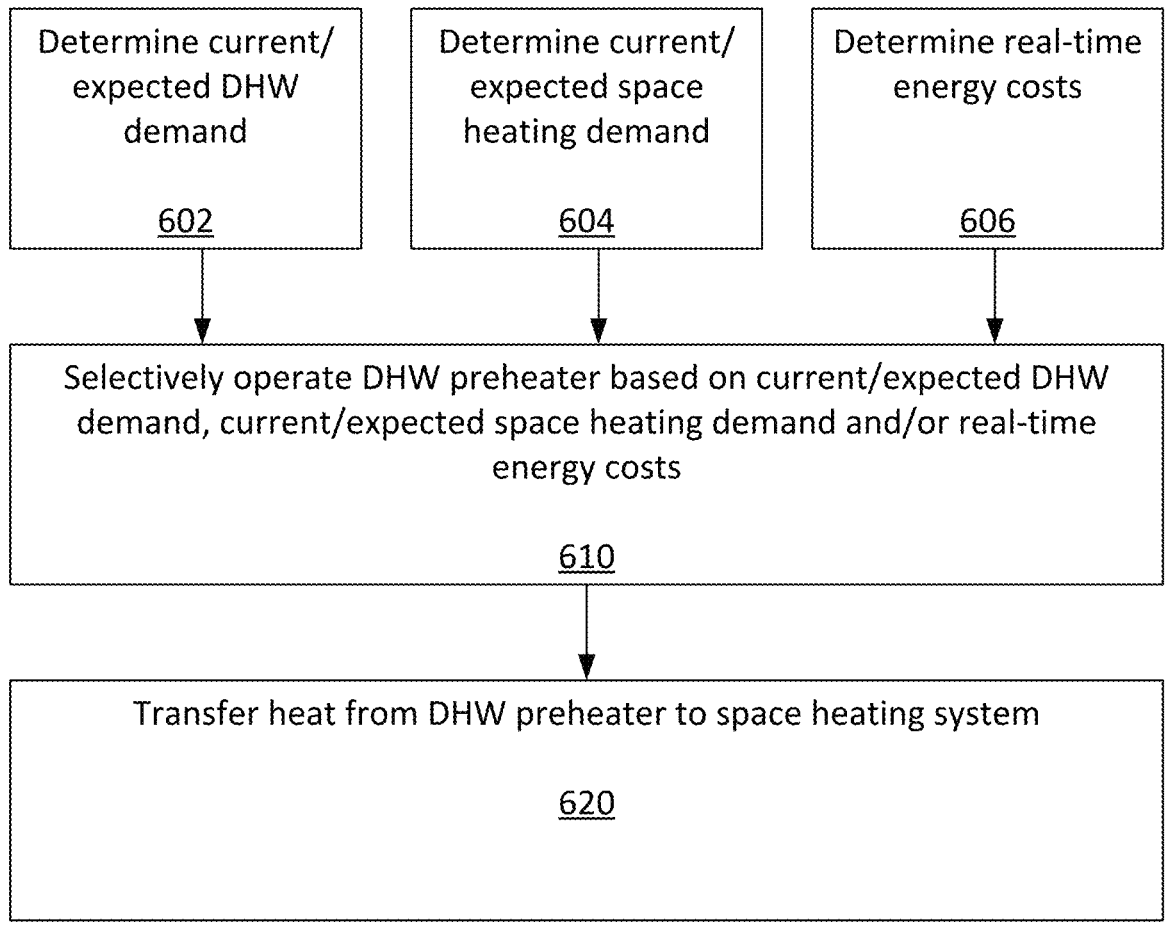
FIG. 6 is a flow chart of a method of operating a DHW preheater, according to an embodiment.

FIG. 6 is a flow chart of a method of operating a DHW preheater, according to an embodiment. At 602, a current and/or expected demand for domestic hot water can be determined, for example, based on current outflow, patterns of use, etc. At 604, a current and/or expected demand for space heating can be determined, for example, based on current heating use, patterns of use, outside temperature, weather forecasts, etc. At 606 real-time energy costs can be determined.

At 610, the DHW can be operated based on current/expected demand for domestic hot water, current/expected demand for space heating, and/or real-time energy costs. In embodiments in which the DHW includes multiple heat sources, operating the DHW preheater at 610 can include choosing which heat source(s) to activate based on current energy costs. The DHW preheater can be operated, for example, to meet a current DHW demand, to store additional DHW for an anticipated DHW need, to maintain a temperature of DHW in the DHW preheater in response to transferring heat from the DHW preheater to a space heating system, to increase the temperature of DHW in the DHW preheater to provide additional thermal capacity to condition an input of the space heating system, to "charge" a thermal battery configured to preheat an input of the space heating system, to take advantage of (temporary) low energy costs, and/or for any other suitable purpose. In some instances, the DHW preheater can be operated despite a lack of a current need for DHW and/or space heating. For example, the DHW preheater can be operable to store energy in the form of hot water when energy costs are low (e.g., at night) in anticipation of future need for DHW and/or space heating. At 620, heat can be transferred from the DHW preheater to the space heating system.

While various embodiments have been described above, it should be understood that they have been presented by way of example only, and not limitation. For example, where boilers are described, it should be understood that, where suitable any other heat generator (e.g., a heat pump, a furnace, etc.) can be used. Where methods described above indicate certain events occurring in certain order, the ordering of certain events may be modified. Additionally, certain of the events may be performed concurrently in a parallel process when possible, as well as performed sequentially as described above. Where methods are described or components are described as making determinations, performing actions, or causing actions to be performed, it should be understood that such methods, determinations, and/or actions can be implemented via computer code (stored in memory and/or executing on a processor). For example, where the DHW preheater is described as selecting a fuel source, it should be understood that, in some embodiments, a code stored in a memory executing on a processor can cause the processor to select the fuel source and/or send a signal to cause the fuel source to be selected. The memory and/or the processor can be physically located on the DHW preheater and/or located on a remote compute device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In some embodiments, an apparatus can include a boiler having an inlet and an outlet. The boiler can be configured to supply heated fluid to space heating circuit via the outlet. The apparatus can further include a water heater configured to supply domestic hot water, cold fluid from the space heating circuit configured to be preheated by the water heater before entering the boiler inlet.

In some embodiments, a water heater can include a tank configured to contain domestic hot water and a heat exchanger configured to transfer heat from the domestic hot water to cold fluid from a space heating circuit.

In some embodiments, a water heater can be configured to heat water using an electric heater, such as an electric immersion heater, and a fossil fuel source and/or fossil fuel burner.

In some embodiments, a water heater having multiple energy sources can include a fuel use module configured to obtain a real-time electricity price and/or selectively actuate one of the multiple energy sources based, at least in part, on the real-time electricity price.

In some embodiments, a water heater can be configured to heat water using multiple energy sources, such as an electric immersion heater and a fossil fuel source. Each or the energy sources can be configured to completely meet an expected and/or predetermined peak demand for domestic hot water. Optionally, a fuel use module a fuel use module can be configured to balance use the energy sources (e.g., the electric immersion heater and the fossil fuel source) based, at least in part, on a real-time electricity price.

In some embodiments, a closed water heater loop can include a first heat exchanger immersed in a tank of a water heater and a second heat exchanger disposed outside the tank of the water heater. The second heat exchanger can be configured to transfer heat to cold fluid from a space heating circuit. Optionally, the second heat exchanger can be disposed within a phase change thermal battery.

In some embodiments, an apparatus including a boiler and a water heater can further include a thermal battery. A heat exchanger can be configured to transfer heat from domestic hot water to the thermal battery. A fuel use monitor configured to obtain a real-time electricity price, the fuel use monitor configured to cause the heat exchanger to transfer heat to the thermal battery when the real-time electricity price is below a low threshold price. Optionally, the fuel use monitor can be configured to cause the heat exchanger to transfer heat from the thermal battery when the real-time electricity price is above a high threshold price.

In some embodiments, an apparatus including a boiler and a water heater can further include a pre-heater configured to transfer heat from a waste heat source to cold fluid from a space heating circuit and/or a domestic hot water makeup before the cold fluid from the space heating circuit and/or the domestic hot water makeup are received by the water heater.

In some embodiments, an apparatus can include a tank configured to contain domestic hot water, an inlet configured to receive domestic hot water makeup, and an outlet configured to supply the domestic hot water. The apparatus can further include multiple heat sources configured to heat the domestic hot water. A heat exchanger can be disposed in the tank, the heat exchanger configured transfer heat from the domestic hot water to a return leg of a space heater loop.

In some embodiments, a water heater be operable to heat water using multiple heat sources to heat domestic hot water. Optionally, the water heater can be configured to completely meet a predetermined peak demand for hot water using less than all (e.g., one) of the multiple heat sources. In some instances each of the multiple heat sources can be configured to completely meet the predetermined peak demand, such that one heat source operating independently can be sufficient to meet the predetermined peak demand.

What is claimed is:

1. A method, comprising:
   determining at least one of a current or an expected demand for domestic hot water;
   determining at least one of a current or an expected demand for space heating;
   transferring heat from a domestic hot water preheater to a cold return of a space heating system based on the current or the expected demand for domestic hot water and the current or the expected demand for space heating.

2. The method of claim 1, wherein heat is transferred from the domestic hot water preheater to the cold return of the space heating system based on the current or the expected demand for domestic hot water being below a threshold value.

3. The method of claim 1, further comprising:
   determining that an energy cost associated with a heat source of the domestic hot water preheater is below a threshold value;
   heating domestic hot water in the domestic hot water preheater based on the energy cost being below a first threshold and not based on the current or expected demand for domestic hot water.

4. The method of claim 1, wherein transferring heat from the domestic hot water preheater to the cold return of the space heater includes transferring heat to a thermal battery thermally disposed between the domestic hot water preheater and the space heating system.

5. The method of claim 1, wherein:
   steam and/or hot water for space heating is sourced from a boiler having an inlet and an outlet;
   the domestic hot water is sourced from a water heater; and
   heat is transferred from the domestic hot water preheater to cold fluid before entering the inlet of the boiler.

6. The method of claim 5, wherein:
   the water heater includes a tank configured to contain domestic hot water; and
   the hot water preheater includes a heat exchanger configured to transfer heat to the cold fluid.

7. The method of claim 5, wherein:
   the water heater includes an electric immersion heater configured to completely meet a predetermined peak demand for domestic hot water; and
   the water heater is configured to use a fossil fuel source that is configured to completely meet the predetermined peak demand for domestic hot water.

8. The method of claim 7, further comprising balancing the electric immersion heater and the fossil fuel source based, at least in part, on a real-time electricity price.

9. The method of claim 1, wherein transferring heat to the cold return of the of the space heating system further comprises transferring heat from a closed water heater loop that includes a first heat exchanger immersed in a water heater tank of the water heater and transferring heat to the cold return of the space heating system using a second heat exchanger disposed outside the water heater tank.

10. The method of claim 9, wherein the second heat exchanger is disposed within a phase change thermal battery.

11. The method of claim 10, further comprising:
   transferring heat to the phase change thermal battery when the real-time electricity price is below a threshold price.

12. The method of claim 10, further comprising:
   obtaining a real-time electricity price; and
   transferring heat from the phase change thermal battery to the cold return of the space heating system when the real-time electricity price is above a threshold price.

13. The method of claim 12, wherein a water heater is configured to heat water using an electric heater and a fossil fuel source, the method further comprising:
   heating water in the water heater using at least one of the electric heater or the fossil fuel source.

14. The method of claim 13, further comprising an electric immersion heater and a fossil fuel burner.

15. The method of claim 13, further comprising:
   obtaining a real-time electricity price, and
   selectively actuating one of the electric heater or the fossil fuel source based, at least in part, on the real-time electricity price.

* * * * *